United States Patent Office 3,560,581
Patented Feb. 2, 1971

3,560,581
PROCESS FOR UPGRADING CHLORINATED HEAVY RESIDUES
Albert Antonini, Paris, Maurice Goharel, Saint-Auban, Basses-Alpes, and Georges Wetroff, Le Thillay, Seine-et-Oise, France, assignors to Produits Chimiques Pechiney-Saint-Gobain, Neuilly-sur-Seine, France
No Drawing. Continuation-in-part of application Ser. No. 354,786, Mar. 25, 1964. This application July 25, 1967, Ser. No. 655,767
Int. Cl. C07c 17/34
U.S. Cl. 260—654
7 Claims

ABSTRACT OF THE DISCLOSURE

A process for upgrading chlorinated heavy residues resulting from the production of chlorinated hydrocarbons which include chlorobenzenes of the type tetra-, penta- and hexachlorobenzene, hexachlorobutadiene, hexachloroethane and tar-like products by mixing the residue with a compound capable of fixing free chlorine and advancing the mixture in a vapor state and in turbulent flow through a reaction zone at a rate sufficient to give a Reynolds mean-value number in excess of 2000 with the reaction zone having a total internal surface to cross-section ratio in excess of 500, supplying the vapor to the reaction zone at a pressure in excess of 1 kg./cm.$^2$, and heating the mixture to a temperature within the range of 440–550° C. during passage through the reaction zone.

This is a continuation-in-part of our copending application Ser. No. 354,786, filed Mar. 25, 1964, now abandoned and entitled "Industrial Process for Treating Hydrochlorinated Hydrocarbons."

This invention relates to the treatment of highly chlorinated heavy residues from chemical chlorination reactions and it relates more particularly to an industrial process for upgrading the industrial preparation of chlorinated hydrocrabons.

Industrial preparations of chlorinated hydrocarbons have been found to yield complex residues containing compounds of great thermal stability, such as may be represented by hexachlorobutadiene, chlorinated derivatives of benzene such as tetra-, penta-, and hexachlorobenzene, and hexachloroethane compounds which cannot be recycled in a useful way. In addition, such residues often include heavy products which are tar-like in nature.

Because of the presence of hexachloroethane, it becomes difficult economically to separate the constituents of such mixtures. Fractional crystallization from solvent solutions will not result in a satisfactory separation of hexachloroethane from the chlorinated derivatives of benzene. Separation by fractional distillation is made difficult by solidification of hexachloroethane to form layers on the walls feeding into the apparatus.

A solution to this problem is of considerable economic interest because, in the commercial manufacture of light chlorinated hydrocarbons, for each ton of product as much as 30 to 150 kg. of residual products can be formed. The upgrading of the numerous heavy chlorinated derivatives, such as hexachlorobutadiene and hexachloroethane is one of the objectives of this invention. It is well known that when hexachloroethane is pyrolyzed, the following chemical equilibrium action is established:

$$C_2Cl_6 \rightleftharpoons C_2Cl_4 + Cl_2$$

The equilibrium can be displaced to drive the reaction in the direction to the right by fixing the free chlorine with an appropriate reactant, such as acetylene, ethylene, dichloroethane and generally with chlorinated hydrocarbons containing 2 carbon atoms but not more than 4 chlorine atoms.

In the U.S. Pat. No. 2,447,410 of the Olin Mathieson Chemical Corporation, use is made of propane to fix the free chlorine. However, when the method described in the aforementioned patent is applied, not to hexachloroethane, but to residual mixtures containing hexachloroethane, at about 420° C. in a silica tube, in accordance with the teachings of the aforementioned patent, it has been observed that the speed of reaction is practically nil. If a higher temperature is used, the hexachloroethane content is reduced but, by reason of the contact time required to achieve an appreciable pyrolysis reaction, the propane molecules also undergo cracking to produce carbonaceous products which tend to choke the tubes and passages of the apparatus.

Replacement of propane by other reactants of the types previously described in the treatment of similar residual mixtures will permit the operation to be carried out at higher temperatures without excessive cracking of the reactants. However, in order to obtain a desired degree of transformation of hexachloroethane, it is necessary to exceed a temperature of 500° C. with a relatively high contact time measured in tens of seconds. Under these conditions, there will be obtained an increase in the quantity of heavy derivatives, particularly in hexachlorobutadiene and hexachlorobenzene, whereas the intention is to upgrade the yield of light products and to minimize as much as possible the formation of such heavier products.

Thus it is another object of this invention to provide a method and means to minimize the drawbacks previously described and to make available a thermal means for effective transformation of highly chlorinated heavy residual products and particularly hexachloroethane which said heavy products may contain, to upgrade and increase the yield of lighter chlorinated products.

These and other objects and advantages of this invention will hereinafter appear in the description which is given by way of illustration, but not by way of limitation.

In accordance with the practice of this invention, the mixture of residual heavy chlorinated products and one or several compounds capable of fixing free chlorine are advanced through a reaction zone at a temperature within the range of 400° to 550° C., at a pressure greater than 1 kg./cm.$^2$, and under conditions of turbulent flow, as represented by a high Reynolds mean-value number, preferably greater than 2000, and in which the reaction zone has a total internal surface which is high relative to its cross-section.

In the preferred practice of this invention, the vapors in the reaction zone are brought to a temperature within the range of 440° to 525° C. and the reaction is carried out under a pressure within the range of 1.5 to 6 kg./cm.$^2$.

As used herein, the term "total internal surface" of the reaction zone is meant to refer to the surface area of the internal walls and the media packed into the reaction zone to increase the amount of contacting surface.

In accordance with the practice of this invention, the ratio of total internal surface of the reaction zone to the cross-section of the reaction zone should be more than 500 and preferably greater than 1000. The upper limit depends upon the importance of the residual products and treatment unit, on the one hand, and technological factors, on the other hand. Thus the ratio is higher, the greater the length of the reaction zone. However, the greater the length of the reaction zone, the greater the weight and the higher the pressure drop. These factors must be taken into consideration when the gaseous reactants are passed through the reaction zone. It is also necessary to take into consideration the concentration of the materials used.

By way of an example, a commercial unit embodying the practice of this invention can be fabricated to have a reaction zone with a ratio of internal surface/cross section within the range of 4,000 to 20,000.

The composition of the mixture of the residual heavy products and one or more of the compounds capable of fixing free chlorine may be varied, depending upon the nature of the residual product to be upgraded and the results desired. In general, the proportions may range from 3 to 16 parts by weight of residual products to one part by weight of chlorine fixing compound or compounds.

The following is a typical analysis of the complex residues resulting from the chemical preparation of chlorinated hydrocarbons and subject to treatment in accordance with the practice of this invention:

| | Percent by weight |
|---|---|
| Hexachlorobutadiene | 10–60 |
| Perchlorethylene | 0–75 |
| Hexachloroethane | 3–20 |
| Hexachlorobenzene | 2–20 |
| Tetrachlorobenzene } Pentachlorobenzene } | 3–15 |
| 1,2,4-trichlorobenzene | 0–2 |
| Tar-like products | 0.1–5 |

When cooled, the complex residue may contain part of the hexachlorobenzene in a solid crystalline form. In one modification of the invention, this solid crystalline phase is removed by conventional means, such as filtration or centrifuge, before submitting the residue to the treatment of this invention for upgrading. By way of example, a residue having the following composition will have a part of the hexachlorobenzene in crystalline form, when cooled:

| | Percent by weight |
|---|---|
| Hexachlorobutadiene | 30–40 |
| Perchlorethylene | 30–35 |
| Hexachloroethane | 7–12 |
| Tetrachlorobenzene } Pentachlorobenzene } | 8–10 |
| Hexachlorobenzene | 7–15 |
| 1,2,4-trichlorobenzene | 0.5–1 |
| Tar-like products | 1–2 |

After filtration to remove the solids, the residue remaining for treatment in accordance with the practice of this invention will have the following composition:

| | Percent by weight |
|---|---|
| Hexachlorobutadiene | 33–44 |
| Perchlorethylene | 33–39 |
| Hexachloroethane | 8–13 |
| Tetrachlorobenzene } Pentachlorobenzene } | 9–11 |
| Hexachlorobenzene | 2 |
| 1,2,4-trichlorobenzene | 0.5–1.1 |
| Tar-like products | 1.5–2.5 |

Among the well known compounds capable of use in fixing chlorine under the temperature and pressure conditions existing, the following may be given by way of illustration, but not by way of limitation, namely: vinyl chloride, di-chloroethylenes, trichloroethylene, di-and tri-chloroethanes, tetrachloroethanes, ethylene, acetylene and/or propane.

Often times, it is desirable to introduce free chlorine with the other ingredients into the reaction zone to increase the heat of total reaction for transformation of the heavy residues since chlorination on partially substituted, saturated or unsaturated hydrocarbon materials is an exothermic reaction.

The following examples are given by way of illustration, but not by way of limitation:

EXAMPLE 1

In the production of tetrachloroethylene, a dense, dark color residual is secured having the following composition in percent by weight:

| | |
|---|---|
| Tetrachloroethylene | 68.8 |
| Hexachloroethane | 7.5 |
| Hexachlorobutadiene and other $C_4$ compounds | 20.8 |
| Chlorinated benzene derivatives | 1.4 |
| Tarry products | 1.5 |

To 75 parts by weight of this residual product there is added 25 parts by weight of trichloroethylene. The residual mixture is introduced at a flow rate of 2.3 kg./hour into a preheater wherein the residual product is vaporized at a temperature within the range of 230° C. to 250° C. The vapors are then introduced into a reactor formed of an alloy containing about 75 percent by weight nickel, referred to in the trade as "Inconel." The reactor, in the reaction zone, has an internal diameter of 0.5 cm. and a length of 1000 cm., rolled in the form of a spiral and housed within an enclosure heated to a temperature of 450° C. The surface area defined between internal walls of the reactor is 1,570 cm.$^2$ to give a total ratio of internal surface/cross section of about 8,000. The gases are introduced into the entrance end of the reactor at a pressure of about 3 kg./cm.$^2$ and the travel of the vapors through the reaction zone is at a rate to give a contact time of 2–3 seconds. The vapor flow is of a character defined by a Reynolds mean-value number of about 2500.

The vapors of organic products issue from the exit end of the reactor to provide a liquid having the following composition in percent by weight:

| | |
|---|---|
| Trichloroethylene | 23.5 |
| Tetrachloroethylene | 59.6 |
| Pentachloroethane | 0.1 |
| Hexachloroethane | 1.5 |
| Hexachlorobutadiene and other $C_4$ compounds | 14.9 |
| Chlorinated benzene derivatives | 0.4 |

The percent recovery after the treatment is calculated at 90 percent by weight.

By way of comparison, the same residual mixture and trichloroethylene, in the same amount and under the same working conditions, are treated in an "Inconel" reactor having a diameter of 5 cm. and a length of 40 cm. The reactor is filled with "Inconel" ribbons to give a total internal surface of 3028 cm.$^2$ with the ribbon surface accounting for 2400 cm.$^2$. The ratio of internal surface to cross-section equals 154. In operation, the pressure of the vapors and reactor is about 1 kg./cm.$^2$. Under these reaction conditions, it is found that practically no transformation of hexachloroethane is achieved even though the contact time of the vapor in the reaction zone is about 4 seconds and equivalent temperatures are employed.

EXAMPLE 2

A residual product issuing from a unit producing tetrachloroethylene has the following composition in percent by weight:

| | |
|---|---|
| Tetrachloroethylene | 66.7 |
| Hexacoloroethane | 6.2 |
| Hexachlorobutadiene and other $C_4$ compounds | 25.6 |
| Chlorodinated benzene derivatives | 1.0 |
| Tarry products | 0.5 |

This residual product is introduced with propane in a liquid phase in a vaporizer provided with a double casing heated at about 270° C. and at a flow rate per hour of 1.95 kg. of the residual product and 0.16 kg. of propane. The vapors thus introduced are injected into a reactor identical to that of Example 1, characterized by a ratio of total internal surface to cross-section equal to 8,000. The reactor is brought to a temperature of about 450° C. The absolute pressure of vapors in the reactor is 3 kg./cm.$^2$ and the contact time will be 2.4 seconds. The flow of the vapor is characterized by a Reynolds number in the order of 2600.

The vapors exhausted from the exit of the reactor are expanded to 1 kg./cm.$^2$ and condensed by cooling at room temperature. Degassing the condensate eliminates the major part of the propane which would not react as well as hydrochloric acid which forms at the rate of 0.57 mole per hour. Washing the uncondensed gases with water eliminates the hydrochloric acid while the remaining gaseous phase mainly includes propane with a small proportion of propene, isopropyl and propyl chloride, allyl chloride and tetrachloroethylene. This gaseous phase is collected and sobmitted to a chlorination treatment in order to transform it into tetrachlorethylene and carbon tetrachloride.

In a continuous working operation 1.81 kg./hour of a condensate is collected having the following composition in percent by weight:

| | |
|---|---|
| Propane and other light hydrocarbons | 2.0 |
| Tetrachloroethylene | 70.9 |
| Hexachloroethene | 2.4 |
| Hexachlorobutadiene and other C$_4$ compounds | 24.4 |
| Chlorinated benzene derivatives | 0.3 |

A non-vaporized liquid settles at the base of the vaporizer in a portion of 90 g./hour and is continuously removed.

The percent recovery of the propane, taking into account its chlorination products, is about 90 mole percent.

The percent recovery of the upgraded products, as compared to the starting residual materials, is 93 percent by weight.

On a comparative basis, the same operations were carried out but under a pressure of 1 kg./cm.$^2$ in an "Inconel" reactor of 5 cm. diameter and 40 cm. length, filled with "Inconel" ribbons. The vapor flow is characterized by a Reynolds number of 750 and the ratio of the total internal surface of the area to surface of its cross-section is equal to 154.

Under these conditions, no apparent transformation of hexacolorethane is observed notwithstanding a contact time of the vapors of 1½ times greater than in the preceding reactor dimensioned to have a diameter of 0.5 cm. and a length of 1,000 cm.

EXAMPLE 3

The same operations as described in Example 2 are carried out. A condensate is also obtained having the same composition as in the aforestated example.

This condensate is reintroduced at a flow rate of 1.8 kg./hour, into the vaporizer simultaneously with the propane in proportions of 0.08 kg. of propane per kg. of condensate. The temperature of the vaporizer is 270° C. and use is made of a working pressure of 3 kg./cm.$^2$. The vapors produced are injected into a reactor having a diameter of 0.5 cm. and a length of 1,000 cm. The contact time in the reactor is 2.6 seconds at 450° C. The effluent from the reactor is condensed to produce a mixture of organic compounds containing only 1 percent by weight of hexachloroethane.

A condensate is thereby obtained which may easily be distilled for the recovery of tetrachloroethylene and hexachlorobutadiene.

It will be apparent from the foregoing that we have provided a simple thermal process for the effective and efficient upgrading of residual products secured in the commercial halogenization such as chlorination of hydrocarbons.

It will be understood that changes may be made in the details of formulation and operating conditions without departing from the spirit of the invention, especially as defined in the following claims.

We claim:

1. In a process for upgrading chlorinated heavy residues from the production of chlorinated hydrocarbons in which the heavy residues contain hexachlorobutadiene, hexachloroethane, hexachlorobenzene, perchlorethylene, tetrachorobenzene, pentachlorobenzene and tar-like products, the steps of mixing the heavy residue witn an organic compound selected from the group consisting of vinyl chloride, dichloroethylene, trichloroethylene, dichloroethane, trichloroethane, tetrachloroethane, ethylene, acetylene and propane, advancing the mixture in a vapor state and in turbulent flow through a non-catalytic reaction zone at a rate sufficient to give a Reynolds number in excess of 2000 and to provide a contact time of no more than 3 seconds said reaction zone having a total internal surface to cross-section ratio in excess of 500, supplying the vapors to the reaction zone at a pressure in excess of 1.5 kg./cm.$^2$, and heating the mixture to a temperature within the range of 440–550° C. during passage through the zone.

2. A process as claimed in claim 1 in which the ratio is in excess of 1000.

3. A process as claimed in claim 1 in which the temperature in the reaction zone is maintained within the range of 450–525° C.

4. A process as claimed in claim 1 in which the mixture advanced through the reaction zone comprises 3–16 parts by weight of the residue to one part by weight of the compound capable of fixing free chlorine.

5. A process as claimed in claim 1 in which the vapor material is introduced into the reaction zone at a pressure with the range of 1.5 to 6 kg./cm.$^2$.

6. A process as claimed in claim 1 in which the ratio of total internal surface to cross-section in the reaction zone is within the range of 4,000 to 20,000.

7. A process as claimed in claim 1 which includes perchloroethylene in the heavy residue in an amount up to 75% by weight.

References Cited

UNITED STATES PATENTS

| | | | |
|---|---|---|---|
| 2,178,622 | 11/1939 | Basel et al. | 260—654(D) |
| 2,447,410 | 8/1948 | Hampel | 260—654(D) |
| 2,857,438 | 10/1958 | Obrecht et al. | 260—654(H) |
| 3,260,761 | 7/1966 | Burrus et al. | 260—654 |

FOREIGN PATENTS

| | | | |
|---|---|---|---|
| 1,331,412 | 5/1963 | France | 260—654(D) |
| 6403225 | 9/1964 | Netherlands | 260—654(D) |

LEON ZITVER, Primary Examiner

J. A. BOSKA, Assistant Examiner

UNITED STATES PATENT OFFICE
CERTIFICATE OF CORRECTION

Patent No. 3,560,581　　　　　　　　　Dated February 2, 1971

Inventor(s) Albert Antonini et al.

It is certified that error appears in the above-identified patent and that said Letters Patent are hereby corrected as shown below:

In the heading to the printed specification, after line 10, insert -- Claims priority, application France, PV 929,092 Mar. 25, 1963 --.

Signed and sealed this 30th day of November 1971.

(SEAL)
Attest:

EDWARD M. FLETCHER, JR.　　　　ROBERT GOTTSCHALK
Attesting Officer　　　　　　　　Acting Commissioner of Paten